US007646898B1

(12) United States Patent
Nowinski et al.

(10) Patent No.: US 7,646,898 B1
(45) Date of Patent: Jan. 12, 2010

(54) METHODS AND APPARATUS FOR PROCESSING MEDICAL IMAGES

(75) Inventors: Wieslaw L. Nowinski, Singapore (SG); Arumugam Thirunavuukarasuu, Singapore (SG)

(73) Assignee: Kent Ridge Digital Labs, Singapore (SG)

(*) Notice: Subject to any disclaimer, the term of this patent is extended or adjusted under 35 U.S.C. 154(b) by 1161 days.

(21) Appl. No.: 10/416,520

(22) PCT Filed: Nov. 24, 2000

(86) PCT No.: PCT/SG00/00185

§ 371 (c)(1),
(2), (4) Date: Aug. 19, 2003

(87) PCT Pub. No.: WO02/43003

PCT Pub. Date: May 30, 2002

(51) Int. Cl.
*G06K 9/00* (2006.01)

(52) U.S. Cl. .................... 382/128; 707/104.1

(58) Field of Classification Search ......... 382/128–134, 382/170, 207–209, 154, 294, 285; 707/104.1
See application file for complete search history.

(56) References Cited

U.S. PATENT DOCUMENTS

| | | | |
|---|---|---|---|
| 5,588,071 A * | 12/1996 | Schultz | 382/168 |
| 5,850,486 A | 12/1998 | Mass, III | |
| 5,970,499 A * | 10/1999 | Smith et al. | 707/104.1 |
| 6,178,271 B1 | 1/2001 | Mass, III | |
| 6,240,308 B1 * | 5/2001 | Hardy et al. | 600/407 |
| 2003/0013951 A1 * | 1/2003 | Stefanescu et al. | 600/407 |

FOREIGN PATENT DOCUMENTS

| | | |
|---|---|---|
| JP | 9-98961 | 4/1997 |
| WO | 00/36565 | 6/2000 |

OTHER PUBLICATIONS

A printout of an internet link re: CD-ROM K.H. Hoehne, Part 1: Brain and Skull: Springer-Verlag, Heidelberg, 1995.
Shenton et al., "Harvard Brain Atlas: A Teaching and Visualization Tool," Biomedical Visualization, pp. 10-17 and 81, (Oct. 30, 1995), XP010196687.
Guan et al., "Design for a 3D Deformable Brain Atlas," Computer-Based Medical Systems, pp. 113-120 (May 12, 1991), XP010024176.
Comunello et al., "CT Scans with Neurocysticerocosis in Epileptics Patients: a Computer-Based Method for Detection and Qualification," Computer-Based Medical Systems, pp. 42-47 (Jun. 18, 1999), XP010345822.
Buhle et al., "Multi-Dimensional Visualization and Quantization of Molecular, Cellular and Anatomical Structures," Visualization in Biomedical Computing, pp. 66-71 (May 22, 1990), XP010018995.
English language Abstract of JP 9-98961.

(Continued)

*Primary Examiner*—Aaron W Carter
(74) *Attorney, Agent, or Firm*—Greenblum & Bernstein, P.L.C.

(57) ABSTRACT

A system for analysing a brain image compares the image with a brain atlas, labels the image accordingly, and annotating the regions of interest and/or other structures. This atlas-enhanced data is written to a file (or more than one file) in the Dicom format or any web-enabled format such as SGML or XML format. The image used may be produced by any medical imaging modality. A fast algorithm is proposed for a landmark-based piecewise linear mapping of one volumetric image into another volumetric image. Furthermore, a new set of brain landmarks are proposed, and algorithms for the automatic identification of these landmarks are formulated for three orientations, axial, coronal, and sagittal.

46 Claims, 15 Drawing Sheets

OTHER PUBLICATIONS

C. Davatzikos, "Spatial Transformation and Registration of Brain Images Using Elastically Deformable Model", Computer Vision and Image Understanding, vol. 66, No. 2, 1997, pp. 207-222.

K.H. Hoehne, Part 1: Brain and Skull: Springer-Verlag, Heidelberg, 1995.

W.L. Nowinski et al., "The Electronic Clinical Brain Atlas. Multiplanar Navigation of the Human Brain", Thieme, New York, Stuttgart, 1997.

J. Talairach et al., "Co-Planar Sterotaxic Atlas of the Human Brain: 3-Dimensional Proportional System: An Approach to Cerebral Imaging", Georg Thieme Verlag/Thieme Medical Publishers, Stuttgart, New York, 1988.

M.E. Brummer, "Hough Transform Detection of the Longitudinal Fissure in Tomographic Head Images", IEEE Transactions on Medical Imaging, vol. 10, No. 1, Mar. 1991, pp. 84-91.

* cited by examiner (a)

(b)

1. Anterior commissure (AC)
2. Posterior commissure (PC)
3. Third ventricle (V3)
4. Fornix (Fo)

ellipsis   rectangle   polyline

METHODS AND APPARATUS FOR PROCESSING MEDICAL IMAGES

FIELD OF INVENTION

The present invention relates to methods and apparatus for manipulating medical images of brains. In particular it relates to systems for using a brain atlas to annotate a medical image, and saving the resultant image for subsequent utilisation.

BACKGROUND OF THE INVENTION

Modern medical imaging technologies offer unprecedented views into human body. Our ability to generate images is much greater than the ability to understand and interpret them. Deformable body models along with warping techniques provide means for analysis of medical images and deformable brain atlases, in particular, are useful for analysis of brain scans. The purpose of the present invention is to facilitate the interpretation of brain scans by neuroradiologists and to provide means to transfer this knowledge to other medical professionals such as neurologists and neurosurgeons.

The present inventor has developed an electronic brain atlas database [3]. There is a strong commercial interest in this database for functional neurosurgery and the atlas has been integrated with several commercial systems.

Apart from this electronic brain atlas, there are numerous brain atlases available in printed form such as [4], and a number of electronic atlases have also been constructed. The major use of the brain atlases is for neuroeducation [2]. Some other applications include functional neurosurgery and brain mapping. However, to our best knowledge, there is no commercial application of brain atlas in neuroradiology yet.

A key operation in atlas-assisted analysis is registration of the atlas with the patient data. The atlas can be warped against the data or, alternatively, the data is warped against the atlas. One of registration approaches is the Talairach proportional grid system transformation that is a piecewise linear operation applied to the volumetric image subdivided by the Talairach landmarks into 12 volumetric sub-images [4]. One known technique performs the Talairach transformation in realtime based on texture mapping, but it requires a hardware accelerator for texture mapping to be performed efficiently.

In addition, the placement of the landmarks is manual and needs domain knowledge. Several non-linear warping approaches have also been proposed [1], but they are time consuming, highly dependent on starting points and at present far from clinical applications yet.

SUMMARY OF THE INVENTION

In general terms, the present invention proposes that a system for analysing a brain image comprises receiving a brain image, comparing the image with a brain atlas, labelling the image accordingly, and annotating the regions of interest and/or other structures. The image used in the invention may be an image produced by any medical imaging modality.

We further propose a fast algorithm for a landmark-based piecewise linear mapping of one volumetric image into another volumetric image.

Furthermore, because of the importance of the Talairach transformation for clinical applications, we propose a new set of the landmarks, and algorithms for the automatic identification of these landmarks are formulated for three orientations, axial, coronal, and sagittal. It is assumed that the reference planes of the data are given by the user, such as intercommissural plane or interhemispheric (longitudinal) fissure. If necessary, automatic identification of the reference planes may be attempted by using some public domain algorithms, e.g. [5]. Some presented algorithms may benefit from extracting the brain from the head data prior to landmark identification, and there are several public domain algorithms to do it—however this step is merely preferable in the present invention.

Generally, the landmarks we choose here to use are defined by peaks and valleys (troughs) of density profiles or projections. Clearly, the significance of peaks and valleys are reversed if the image is replaced by a reversed intensity image (e.g. a T2-weighted image rather than a T1-weighted image).

A system combining various aspects of the invention may be fast, almost fully automatic, and need not require any hardware accelerator. This is because the registration technique makes use of anatomical knowledge to narrow the search within the brain space, and permits the use of simple analysis operations.

Furthermore, radiology is becoming digital and integration of image data (from PACS) with textual data is becoming more available. Telemedicine, especially web-enabled, is also booming. The present invention is well aligned with these trends.

Preferably, the brain data is read from a file in the Dicom format, and atlas-enhanced data is written to a file (or to more than one file) in the Dicom or any web-enabled format such as SGML or XML format. Dicom is the standard format for digital imaging and communications in medicine. XML is an emerging standard in web applications.

Although the invention has been described above in terms of a method, all aspects may equivalently be expressed as a computer device having a processor arranged to carry out a method according to the invention.

BRIEF DESCRIPTION OF THE DRAWINGS

Embodiments of the invention will now be described by way of example only.

FIG. 7c is a graph representing a plot of intensities along the AC-PC line as drawn in FIG. 7a.

DETAILED DESCRIPTION

1. Introduction

Figure 1:
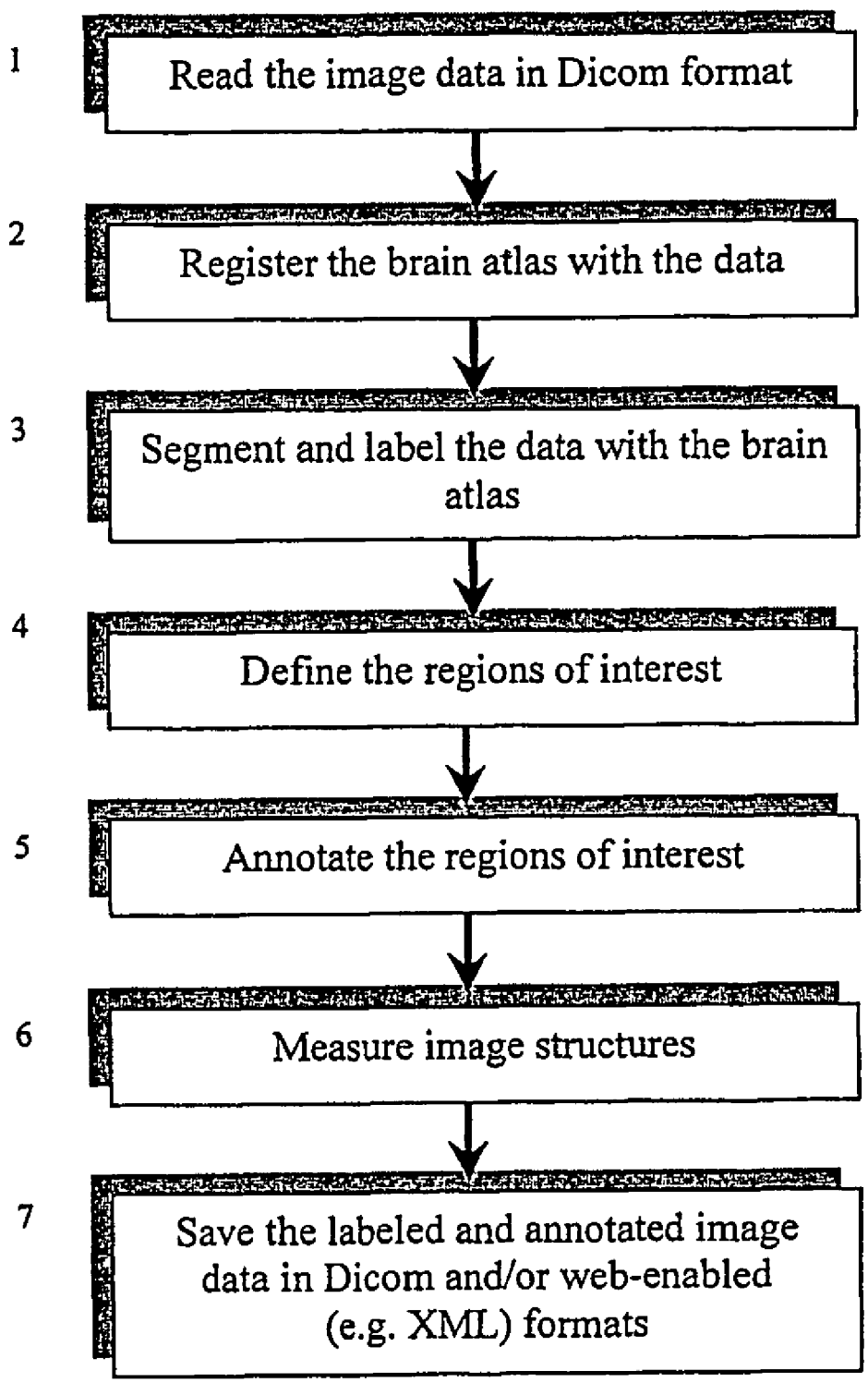
FIG. 1 is the flowchart showing the steps in an embodiment of a method according to the invention.

FIG. 1 illustrates in conceptual terms a method according to the present invention.

The patient specific image data are read in Dicom format (step 1), which is a standard format in diagnostic imaging and Dicom readers are commonly available. Then in step 2, the brain atlas is registered with the data (a fast, automatic method to do it is given below), so the neuroradiologist can segment and label the data by means of the atlas (step 3). In particular, the region(s) of interest can be defined on the images (step 4) and annotated (step 5), and segmentation and labeling can be done within these regions of interests. In addition, the image structures can optionally be measured (step 6). In step 7, the atlas-enhanced data can be stored for further processing by other medical professionals, such as neurologists and neurosurgeons. In particular, the atlas-enhanced data can be stored in Dicom format and/or in any web-enabled format such as XML. These steps are described in much detail below.

2. Registration

First, a general algorithm for mapping one volumetric image into another one is formulated. Then, the detailed steps for performing data-to-atlas mapping and atlas-to-data mapping are specified by using this algorithm. Next, the use of this algorithm to perform the Talairach proportional grid system transformation is discussed. In particular, the algorithms for the automatic identification of the landmarks required for the Talairach transformation are formulated for each orthogonal orientation: axial, coronal, and sagittal.

2.1. Volumetric Image to Volumetric Image Mapping

The method of mapping a volumetric image composed of rectangular images into another volumetric image composed of rectangular images is proposed in the present invention. First, the mapping of the single image into another image is presented and illustrated in FIG. 2. Then, the mapping in the third dimension is given and illustrated in FIG. 3.

Figure 2:
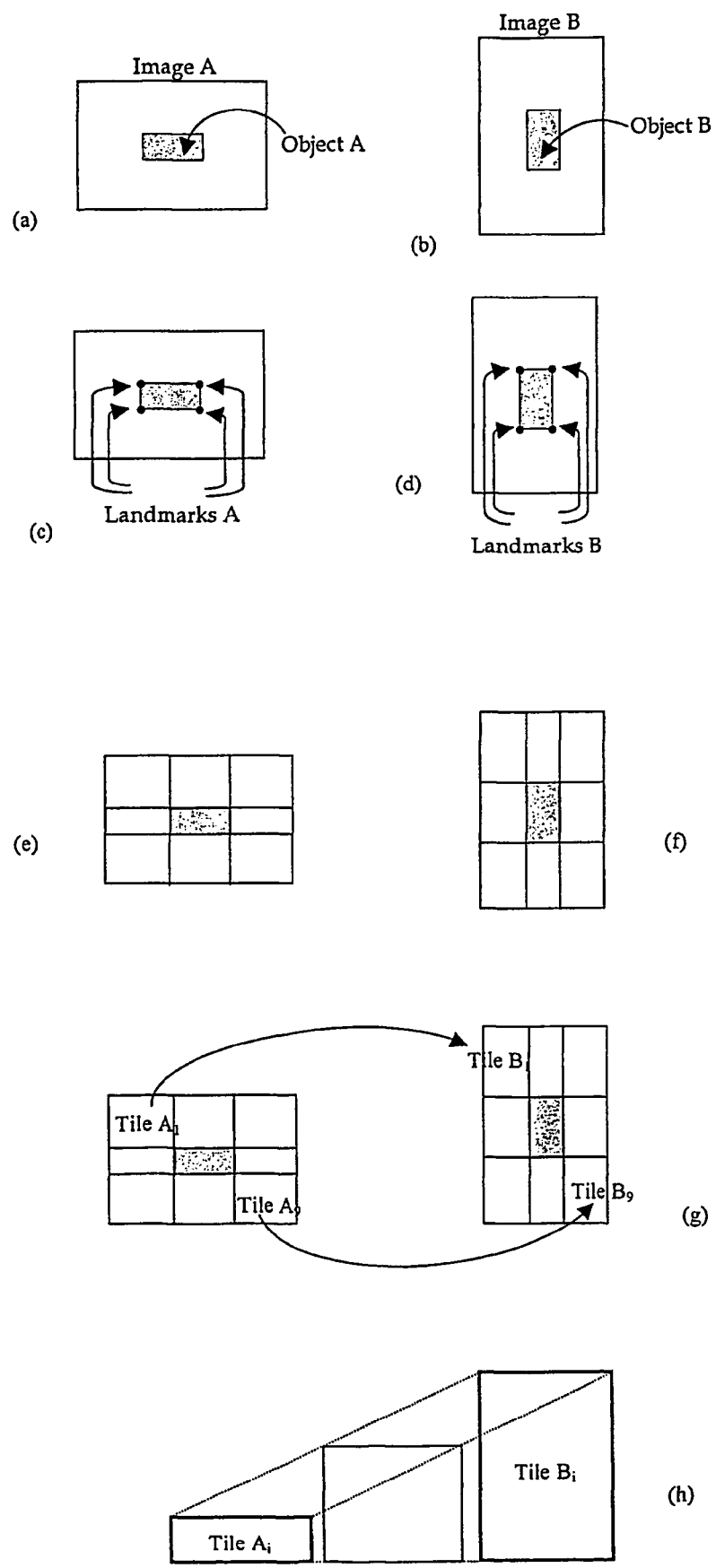
FIG. 2 illustrates the concept and steps of mapping one rectangular image into another rectangular image.

The mapping of the single rectangular image into another rectangular image with, in general, a different dimension is shown in FIG. 2. Image A containing Object A is mapped into Image B with object B. First some point landmarks are defined in Image A (Step 1). These may be some anatomical landmarks or other characteristic points. In particular, they may be the Talairach landmarks. In FIG. 2, the landmarks are the corners of Object A. Then, the corresponding landmarks are defined in Image B. Both sets of landmarks carry the information about the common features in the images under registration. Next, each image is subdivided into subimages (rectangular tiles) by drawing the lines horizontal and vertical to image edges and passing through the landmarks (Step 2). Next, the correspondence between each pair of the tiles is established by, for example, following the same order of numbering the tiles in both images (Step 3). Finally, for each corresponding pair of the tiles, each tile from Image A is mapped proportionally in two dimensions into the corresponding tile in Image B. In this way, the complete Image A is transformed into Image B.

Figure 3:
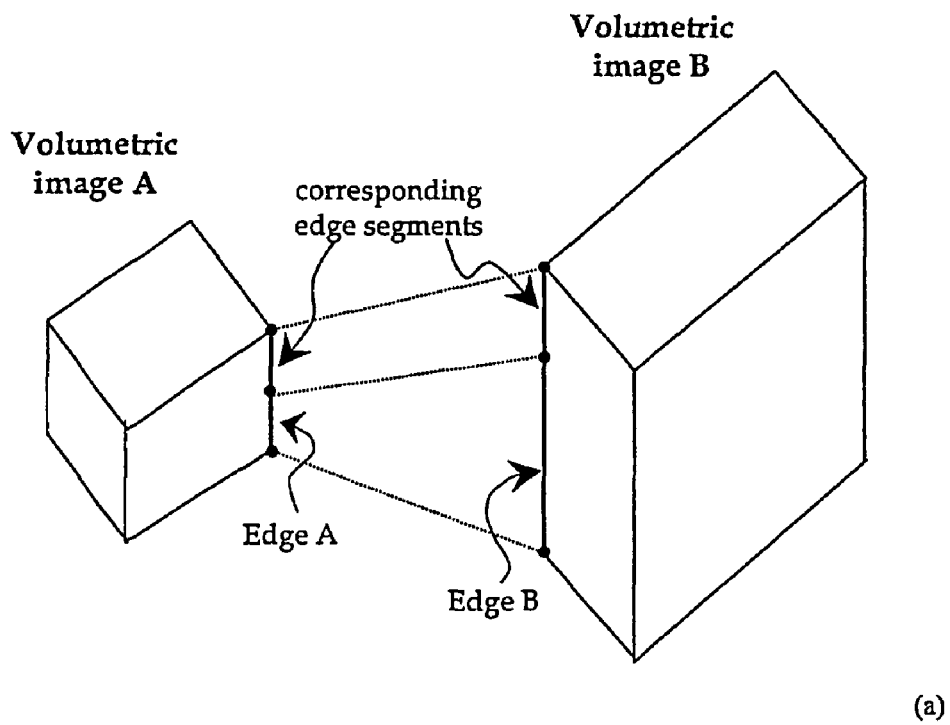
FIG. 3 extends the concept from FIG. 2 into third dimension.
Figure 3:
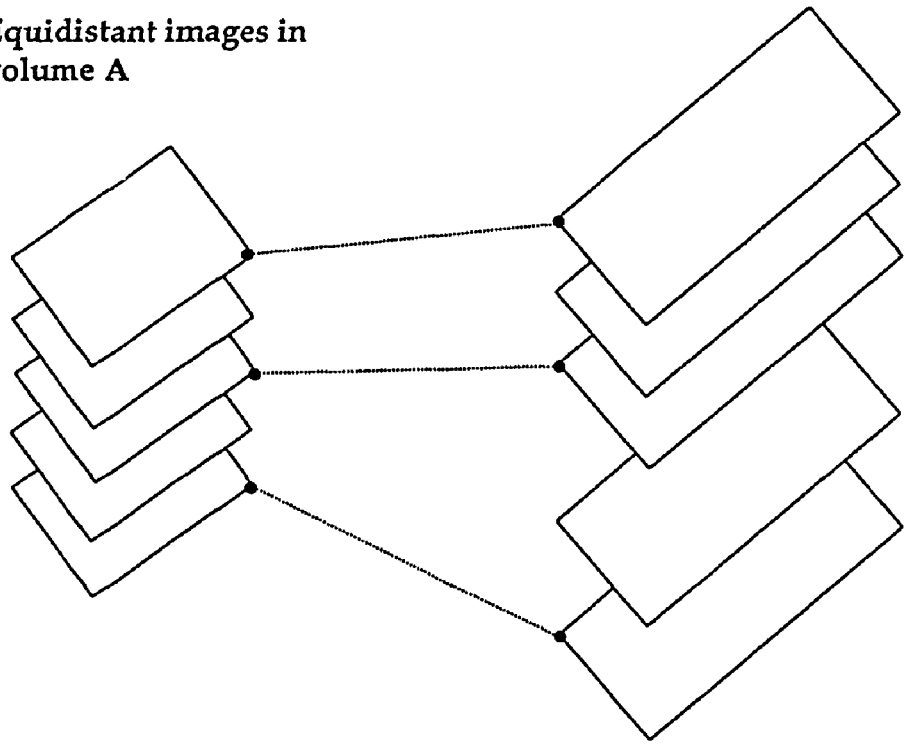

In the third dimension, mapping of one volumetric image into another volumetric image involves a suitable placement of the images, without warping them. The mapping of Volumetric image A into Volumetric image B is shown in FIG. 3. The corresponding edges in third dimensions are identified in both volumetric images. Edge A is subdivided into edge segments and Edge B is subdivided into corresponding edge segments too. For each edge segment of Edge A the images from the Volumetric image A lying within this edge segment are placed proportionally within the corresponding edge segment of segment B. In this way, the placement of the images along the third dimension is done piecewise linearly.

For the known sets of the corresponding landmarks, the mapping algorithm can be performed fully automatically without user intervention.

2.2. Atlas-Data Registration

There are two ways of putting the images and the atlas in registration, atlas-to-data mapping and data-to-atlas mapping. Either of the techniques according to the present invention is very fast compared to the known techniques, and can be performed in a fraction of a second, rather than, as in known techniques, in minutes, hours or even days.

2.2.1. Atlas-to-Data Mapping

The following steps are done to warp the atlas against the data (Steps 1-8) and to visualize the fused volumetric image (Step 9):

1. Identify the landmarks on the data.

2. Identify the landmarks on the atlas.

3. Tile the atlas along the atlas landmarks; in this way the set of rectangular atlas tiles is created.

4. Select an edge on the tile for tile correspondence; for instance, the line segment connecting the top-left corner with the bottom-left corner can be selected.

5. For each atlas tile, scale it proportionally to fit to the corresponding data tile.

6. For each scaled atlas tile, place it on the corresponding data tile edge.

7. Identify the landmarks along the edges in the third dimension for both atlas and data 8. Place the warped atlas images piecewise linearly within the (volumetric) data.

9. Blend the registered images interactively; if they do not overlap, take the closest atlas image.

2.2.2. Data-to-Atlas Mapping The following steps are done to warp the data against the atlas (Steps 1-8) and to visualize the fused volumetric image (Step 9):

1. Identify the landmarks on the atlas.

2. Identify the landmarks on the data.

3. Tile the data along the data landmarks; in this way the set of rectangular data tiles is created.

4. Select an edge on the tile for tile correspondence; for instance, the line segment connecting the top-left corner with the bottom-left corner can be selected.

5. For each data tile, scale it proportionally to fit to the corresponding atlas tile.

6. For each scaled data tile, place it on the corresponding atlas tile edge.

7. Identify the landmarks along the edges in the third dimension for both data and atlas.

8. Place the warped data images piecewise linearly within the (volumetric) atlas.

9. Blend the registered images interactively; if they do not overlap, take the closest data image.

2.3. Automatic Identification of the Talairach Landmarks

The mapping method is particularly important when the landmarks are the Talairach landmarks. We define a new set of equivalent landmarks, so called Talairach-Nowinski landmarks, which are suitable for the mapping algorithm illustrated in FIG. 2 and FIG. 3. For these landmarks, we formulate an automated method for their identification provided that the images are parallel or perpendicular to the reference planes, it means the midsagittal plane and/or the intercommissural (AC-PC) plane. Otherwise, any public domain algorithm for the identification of the midsagittal plane can be used and the data have to be reformatted accordingly.

The orientations of the images (and consequently the location of the landmarks) comply with the radiological convention:

on axial images, the nose points to the top and the left hemisphere is on the right hand side on coronal images, the left hemisphere is on the right hand side on sagittal images, the nose points to the left.

talairach landmarks

The Talairach landmarks (T landmarks) are defined as follows:

AC—the anterior commissure; as the anterior commissure is a three-dimensional structure, the AC point landmark is defined as the intersection of the horizontal line passing through the superior edge of the anterior commissure and the vertical line passing through the posterior edge of the anterior commissure PC—the posterior commissure; as the posterior commissure is a three-dimensional structure, the PC point landmark is defined as the intersection of the horizontal line passing through the inferior edge of the posterior commissure and the vertical line passing through the anterior edge of the posterior commissure L—the most lateral point of the parietotemporal cortex for the left hemisphere R—the most lateral point of the parietotemporal cortex for the right hemisphere A—the most anterior point of the frontal cortex P—the most posterior point of the occipital cortex S—the highest, most superior (most dorsal) point of the parietal cortex I—the lowest, most inferior (most ventral) point of the temporal cortex.

New Set of Landmarks

Figure 4:
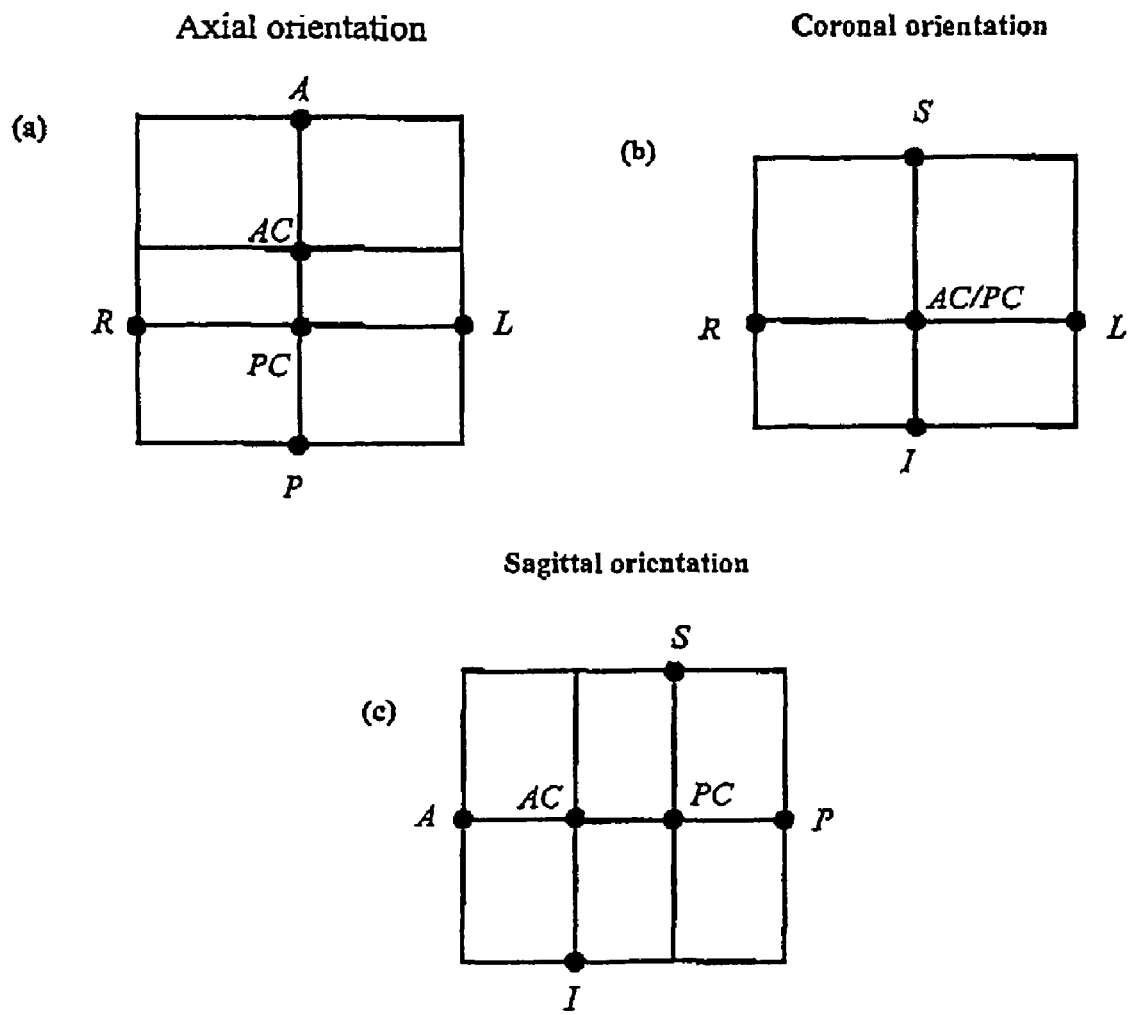
FIG. 4 defines the Talairach-Nowinski landmarks used for registration.

In order to increase efficiency, we introduce in the present invention a new, equivalent set of landmarks called Talairach-Nowinski landmarks (T-N landmarks). These landmarks are defined in a more constructive way than the original Talairach landmarks. They are easier to identify, facilitate performing the mapping as described in FIG. 2 and FIG. 3, and can still be used to perform the Talairach transformation. The T-N landmarks are shown in FIG. 4 and are defined as follows.

AC—the anterior commissure defined as the central point (the gravity center) of the intersection of the anterior commissure with the midsagittal (interhemispheric) plane PC—the posterior commissure defined as the central point (the gravity center) of the intersection of the posterior commissure with the midsagittal plane L—the point of intersection of three planes: the AC-PC (intercommissural) axial plane, the coronal plane passing through the PC, and the sagittal plane passing through the most lateral point of the parietotemporal cortex for the left hemisphere R—the point of intersection of three planes: the AC-PC axial plane, the coronal plane passing through the PC, and the sagittal plane passing through the most lateral point of the parietotemporal cortex for the right hemisphere A—the point of intersection of three planes: the AC-PC axial plane, the midsagittal plane, and the coronal plane passing through the most anterior point of the frontal cortex P—the point of intersection of three planes: the AC-PC axial plane; the midsagittal plane, and the coronal plane passing through the most posterior point of the occipital cortex S—the point of intersection of three planes: the coronal plane passing through the PC, the midsagittal plane, and the axial plane passing through the highest, most superior (most dorsal) point of the parietal cortex I—the point of intersection of three planes: the coronal plane passing through the AC; the midsagittal plane, and the axial plane passing through the lowest, most inferior (most ventral) point of the temporal cortex.

The algorithm for the automatic identification of the T-N landmarks exploit anatomical knowledge and image knowledge. One source of image knowledge is histogram. We describe below two common operations, histogramming and peak identification, followed by the description of the algorithms.

Histogramming

The algorithms formulated below require information about the distribution of brain structures. A standard operation known as histogramming is used for this purpose. The brain is modeled as a mixture of four classes, white matter (WM), grey matter (GM), cerebro-spinal fluid (CSF) and background (B). Each class has its characteristic bell-shape curve on the histogram. The bells are separated by the valleys. The lowest points in two valleys surrounding the bell of a given class define the range of intensities corresponding to this class, see FIG. 5.

Peak Identification

Figures 6A, 6B:
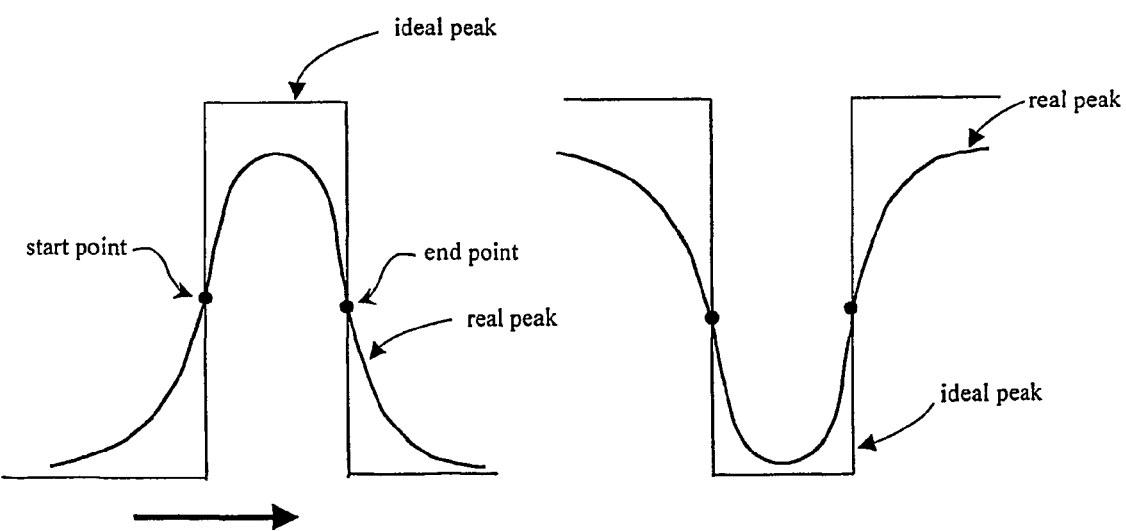
FIG. 6a is a graph of the convex ideal and real peaks corresponding to a structure of interest.
FIG. 6b is a graph of the concave ideal and real peaks corresponding to a structure of interest.

Another common operation used in the algorithms below is the identification of a peak corresponding to a structure of interest. The modeling of the peak representing a brain structure of a given class is illustrated in FIG. 6a. The ideal model of a class assumes homogeneity of intensity so any profile, calculated as the intersection of the structure by a line segment, has a bar shape. The real profile differs from the theoretical one because of noise, partial volume effect, not ideal positioning of the image with respect to the reference planes. Therefore, the algorithms take additional checking against real phenomena. The real and ideal peaks are shown in FIG. 6a.

The peak can be convex, see FIG. 6a, or concave, see FIG. 6b. For instance, a WM structure on a T1-weighted magnetic resonance imaging (MRI) image or PD (proton density) MRI image has a convex peak, while a WM structure on a T2-weighted MRI image has a concave peak.

In order to identify a peak, either convex or concave, any standard edge detection method can be used, in particular the calculation of zero crossing of the second derivative. This calculation is performed for the increasing (start point) and decreasing (end point) slope of the peak, as illustrated in FIG. 6a. The location of the modeled structure is taken as the arithmetical average (the mean value) of the start and end points.

Below, the algorithms for the automatic identification of the T-N landmarks are described in detail for axial, coronal, and sagittal orientations.

2.3.1. Axial Orientation 2.3.1.1. Non-Rotated Axial Images

Figure 7A:
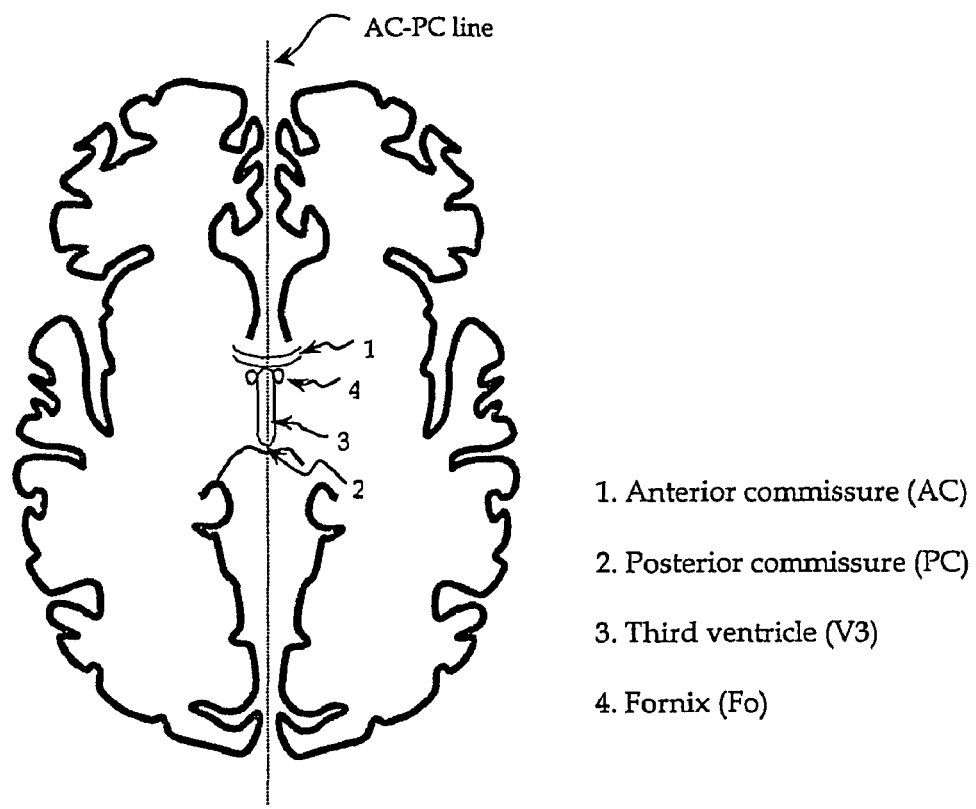
FIG. 7a is a diagrammatic representation of the axial brain image passing through the AC and PC landmarks along with the structures of interest.
Figure 7B:
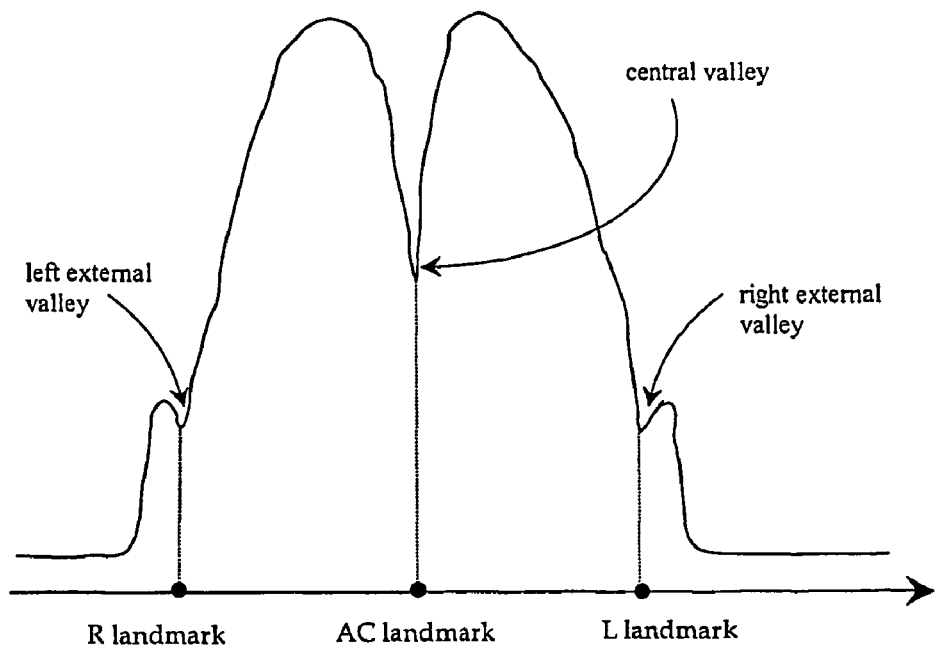
FIG. 7b is a graph representing a vertical (antero-posterior) projection taken from the image in FIG. 7a with the marked valleys of interest. The graph is valid for T1-weighted and proton density magnetic resonance imaging (MRI) images.
Figure 7C:
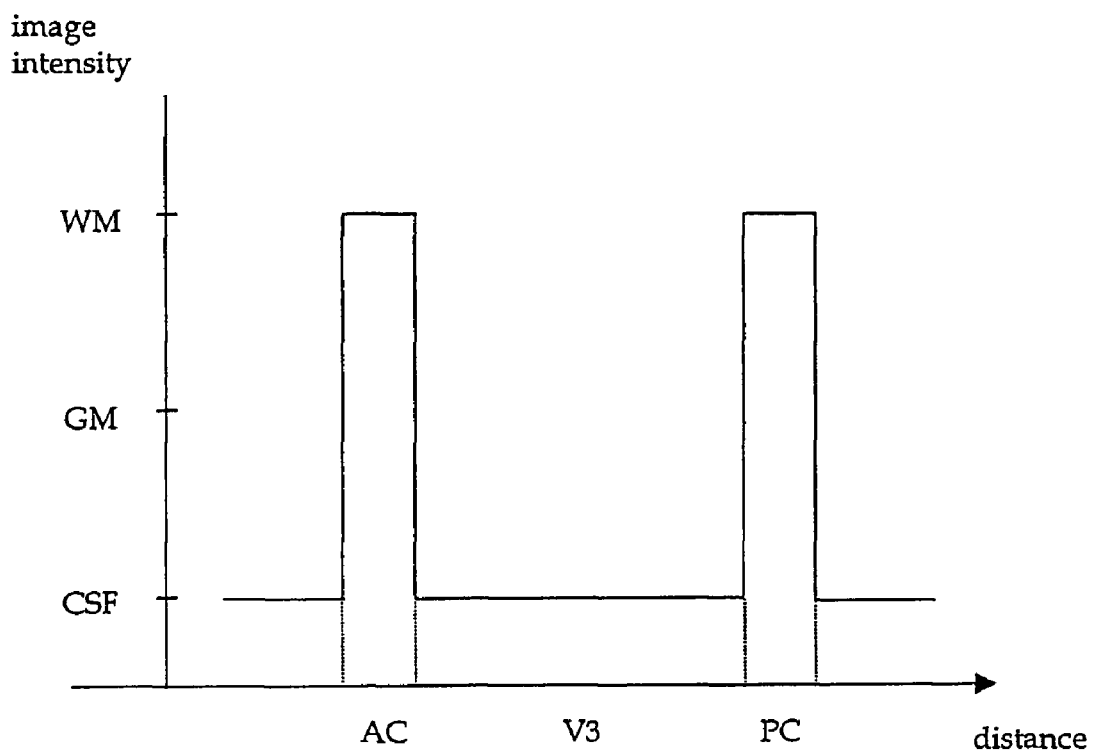

First, the case is considered when the images are not rotated, i.e., the AC-PC line is vertical. The AC-PC image is given (selected by the user), and its anatomy in the region containing the AC and PC in shown in FIG. 7a. From the vertical (anterior-posterior) projection of the image, the lateral position of the AC-PC line is identified at the location of the lowest point in the central valley (resulting from the highest amount of cerebro-spinal fluid), FIG. 7b. When traversing the AC-PC line antero-posteriory, the ideal intensity plot should be as in FIG. 7c. Knowing the peaks and their order, it is possible to identify the AC and PC.

For the selected AC-PC image, the below algorithm identifies the T-N landmarks automatically in the following steps.

1. Optionally, extract the brain from the AC-CP image. Use for that any standard operations, such as region growing combined with morphological operations. This step is not mandatory, but it facilitates the subsequent steps and can improve the accuracy of landmark identification. The extracted brain is treated as the new AC-PC image, and the subsequent operations are applied to this image.

Figure 5:
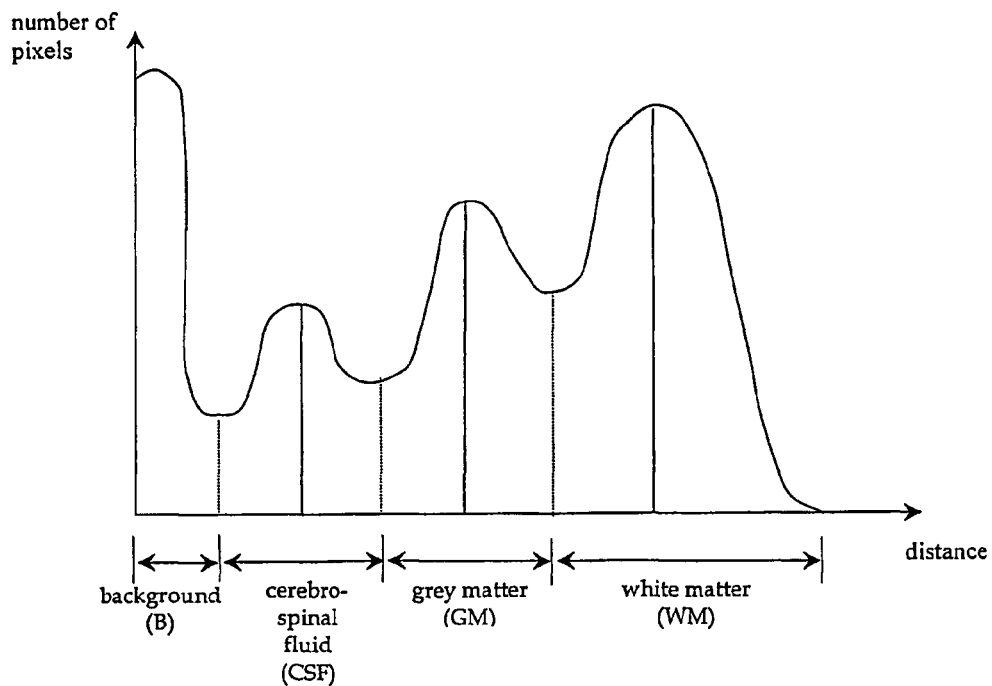
FIG. 5 is a histogram of brain image with a four-class model, white matter (WM), grey matter (GM), cerebro-spinal fluid (CSF) and background (B).

2. Calculate the histogram of the AC-PC image and identify the intensity ranges for the cerebro-spinal fluid (CSF), grey matter (GM), white matter (WM) and background (B) as shown in FIG. 5.

3. Calculate the vertical (antero-posterior) orthogonal projection of the AC-PC image. The shape of this projection is as in FIG. 7b.

4. Identify the valleys on this projection. The lowermost point of the central valley defines the lateral position of the AC-PC line. The lowermost point of the left external valley defines the sagittal extent of the right landmark (R). The lowermost point of the right external valley defines the sagittal extent of the left landmark (L). In case when the brain is extracted from the AC-PC image, the external peaks/valleys do not exist. Then, the left and right slopes of the projection define the sagital extents of the brain.

5. Calculate the intensity profile along the AC-PC line. In the ideal case, this profile should look like in FIG. 7c. The real profile differs from the ideal one because of noise, partial volume effect, not ideal positioning of the image, and possible brain scoliosis.

6. Traverse this profile. Any direction of traversing can be used, such as starting anteriorly and move towards the AC, or take the midpoint along the AC-PC line segment and move towards the AC. Identify the first WM peak from top (anterior) along the AC-PC. Take this peak as the AC peak.

7. For the identified AC peak, find its start and end points. Any method can be used for this purpose. In particular, the zero crossing of the second derivative can be used, see FIG. 6.

8. As the AC landmark, take the mean value of the start and end points of the identified AC peak.

9. Move posteriorly along the AC-PC line and identify another WM peak, see FIG. 7c. Take this peak as the PC peak.

10. For the identified PC peak, find its start and end points. Any method can be used for this purpose. In particular, the zero crossing of the second derivative can be used, see FIG. 6.

11. As the PC landmark, take the mean value of the start and end points of the identified PC peak.

12. For the given sagittal positions of the L and R landmarks, calculate their three-dimensional positions based on their definitions from FIG. 4.

Figure 7D:
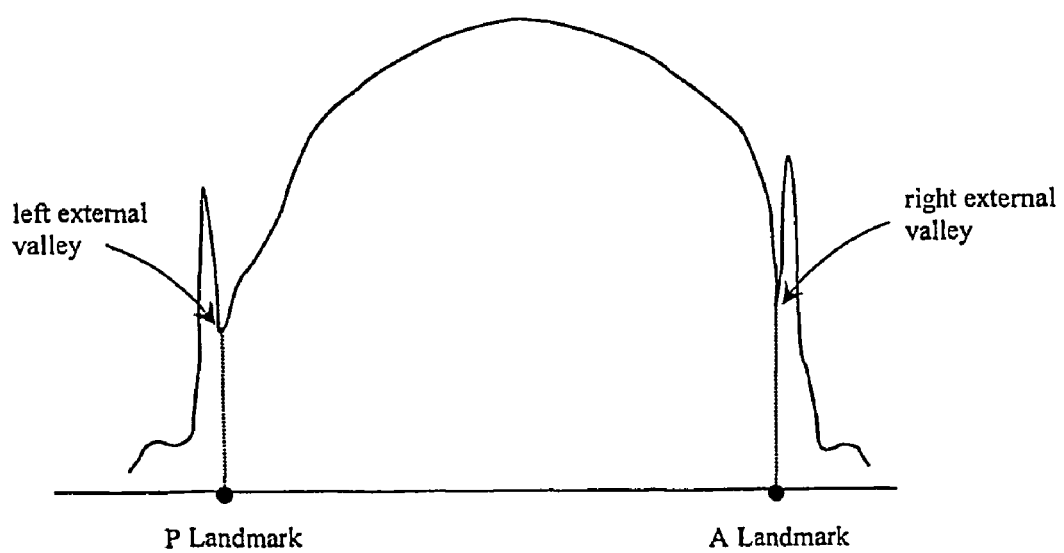
FIG. 7d is a graph representing a horizontal projection taken from the image in FIG. 7a with the marked valleys of interest. The graph is valid for T1-weighted and proton density MRI images.

13. Calculate the horizontal (right-left hemisphere or left-right image) orthogonal projection of the AC-PC image. The shape of this projection is as in FIG. 7d.

14. For the calculated horizontal projection, identify the lowermost points of the extreme valleys and take them as the coronal extents of the anterior (A) and posterior (P) landmarks, see FIG. 7d. In case when the brain is extracted from the AC-PC image, the external peaks/valleys do not exist. Then, the left and right slopes of the projection define the antero-posterior extents of the brain.

15. For the given coronal extents of the A and P landmarks, calculate their three-dimensional positions based on their definitions from FIG. 4.

16. Place at the PC that atlas coronal plate, which passes through the PC, and scale it linearly to fit to the R-L distance. The dorsal extreme of the atlas plate defines the axial extent of the superior (S) landmark. Place at the AC that atlas coronal plate, which passes through the AC, and scale it linearly to fit to the R-L distance. The ventral extreme of the atlas plate defines the axial extent of the inferior (I) landmark.

17. For the given axial extents of the S and I landmarks, calculate their three-dimensional positions based on their definitions from FIG. 4.

For the real data, the above algorithm has to be extended with additional checking and fine tuning capabilities.

Step 4: position of the AC-PC line can be enhanced by going to the third ventricle (V3), calculating the horizontal profile, identifying the CSF peak; calculating its center, and placing there the AC-PC line. This enhancement may be important in brain scoliosis Step 8: when calculating the AC, while traversing from the third ventricle towards the AC, if the end point of the AC peak is more than 3 mm apart from the start point, take as the AC the start point plus 1.5 mm (the average diameter of the AC is 3 mm)

Step 9: position of the PC can be restricted be imposing a search limit ranging, for instance, (17 mm, 35 mm) starting from the AC Step 11: when calculating the PC, while traversing from the third ventricle towards the PC, if the end point of the PC is more than 2 mm apart from the start point, take as the PC the start point plus 1 mm (the average diameter of the PC is 2 mm)

Step 14: if there are two extreme valleys for the P landmark, take the second valley (as the first valley is between the scalp and dura matter)

In addition, some steps may be optimized. For instance, there is not need to calculate the complete horizontal projection (Step 13). It can only be limited to a strip along the AC-PC line (for instance 10 pixels wide on each side of the AC-PC line). This operation additionally amplifies the peaks/valleys of interest. (in FIG. 7d). Similarly, the central part of the projection can be skipped. For instance, the part between the AC and PC may be omitted.

In order to enhance the accuracy of identification of the R, L, A, and P landmarks in three dimensions, the relevant steps can be applied to the images lying outside the AC-PC image. In particular, the two-dimensional antero-posterior projection of the whole brain volume image can be calculated, and the sagittal extents of the L and R landmarks and the axial extents of the S and I landmarks can be obtained from this projection. Similarly, by calculating the two-dimensional left-right projection of the whole brain volumetric image, the coronal extents of the A and P landmarks are obtained from this projection.

2.3.1.2. Rotated Axial Images

When the AC-PC image is rotated with respect to the AC-PC line, the rotation angle has to be defined and the data images have to be rotated, such that the AC-PC line is vertical (and then the algorithm formulated in section 2.3.1.1 for the non-rotated case can be directly applied). The rotation angle can be obtained by analyzing the orthogonal projections of the AC-PC image and by selecting the one with the deepest central valley (for T1-weighted images), as it contains the most CSF. The rotation angle is calculated automatically in the following steps.

1. Calculate the orthogonal projections of the AC-PC image by taking the projections with a given angle step (for instance every 5 degrees).

2. Select the projections with bi-modal peaks (one central valley).

Figure 8:
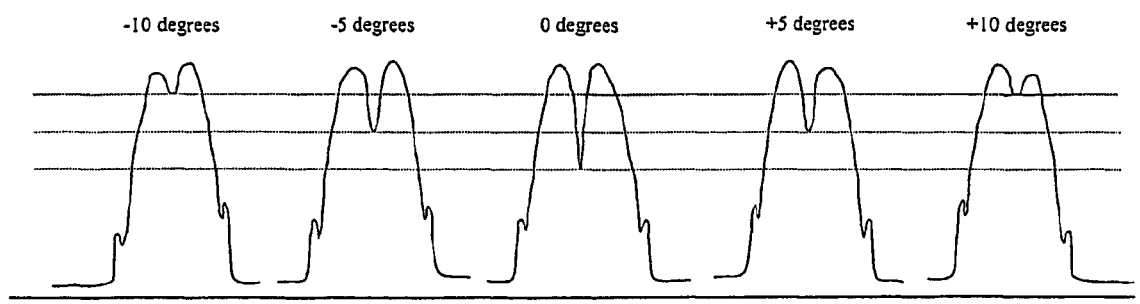
FIG. 8 contains the graphs representing orthogonal (parallel) projections taken from the axial image lying in the AC-PC plane. The graph with the deepest central valley (in the center) corresponds to the projection along the AC-PC direction.

3. From these projections select one with the deepest central valley, see FIG. 8.

4. Generate more projections of the AC-PC image around the projection selected in step 3 with a finer angle step in the range of the given angle step. For instance, in the range of +/−5 degrees around the projection selected in Step 3, the new image projections are generated with 1 degree finer angle step.

5. Find the projection with the deepest valley. The angle corresponding to this projection with the vertical line gives the rotation angle.

2.3.1.3. Imaging Modality Dependence

Figure 9:
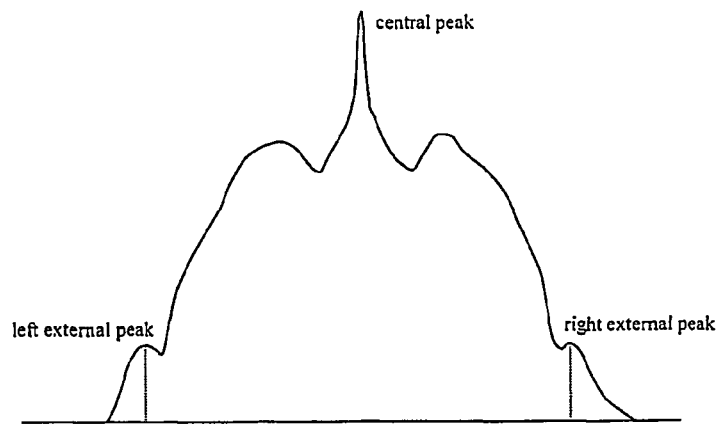
FIG. 9 is a graph representing a vertical projection taken from the image in FIG. 7*a* with the marked peaks of interest. The graph is valid for T2-weighted MRI images.

The presented algorithm, at least in the above formulation, is imaging modality-dependent. The shapes of the projections and profiles, as well as the order of the structure classes in the histogram depend on the modality used. However, by understanding its principle, it is straightforward to adapt it to any modality. For instance, the steps presented above work correctly for the images which intensities of CSF, GM, WM structures are increasing, like for T1-weighted and PD MRI images (and this will be probably the most common case). In case of T2-weighted images, the order is opposite, it means CSF is the most intensive. FIG. 9 shows the vertical projection of the T2-weighted image corresponding to (lying in the same position as) the image in FIG. 7a. The principle of the algorithm remains the same. However, the central and external valleys (representing CSF in T1-weighted images) should be replaced by the central and external peaks (representing CSF in T2-weighted images), compare FIG. 7b and FIG. 9. Similarly, the convex peaks in FIG. 7c should be replaced by the concave peaks (as discussed in FIG. 6).

2.3.2. Coronal Orientation 2.3.2.1. Non-Rotated Coronal Images

Figure 10A:
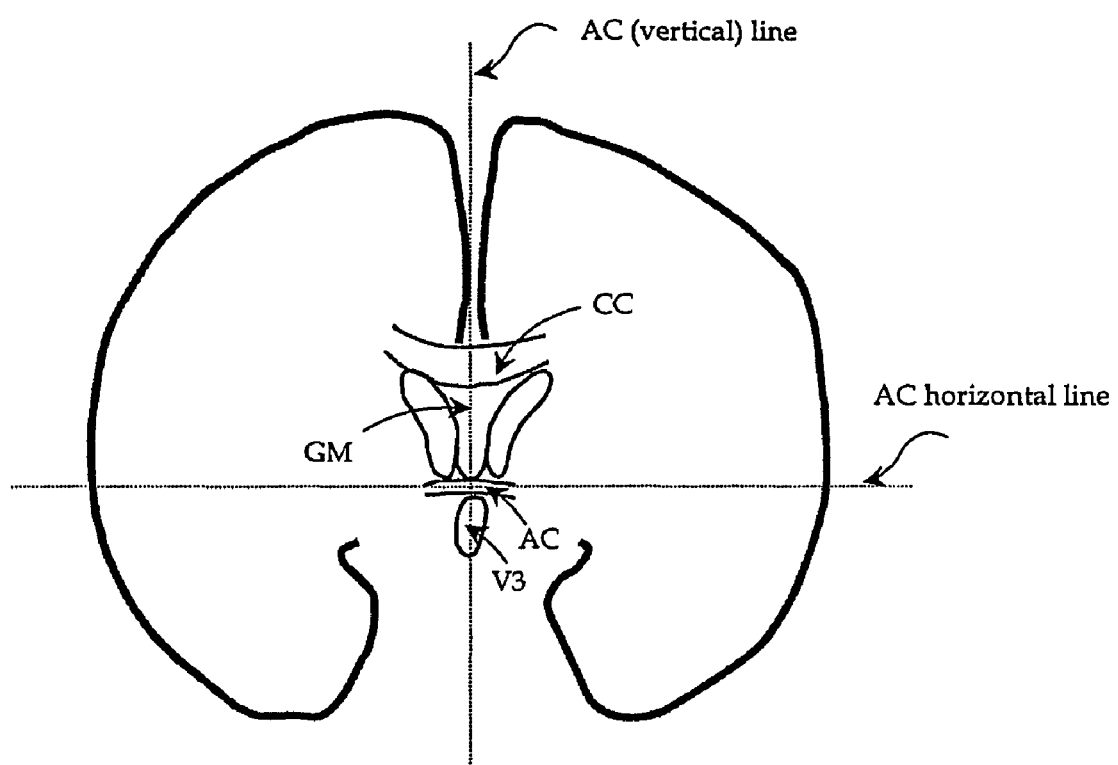
FIG. 10*a* is a diagrammatic representation of the coronal brain image passing through the AC along with the structures of interest.
Figure 10B:
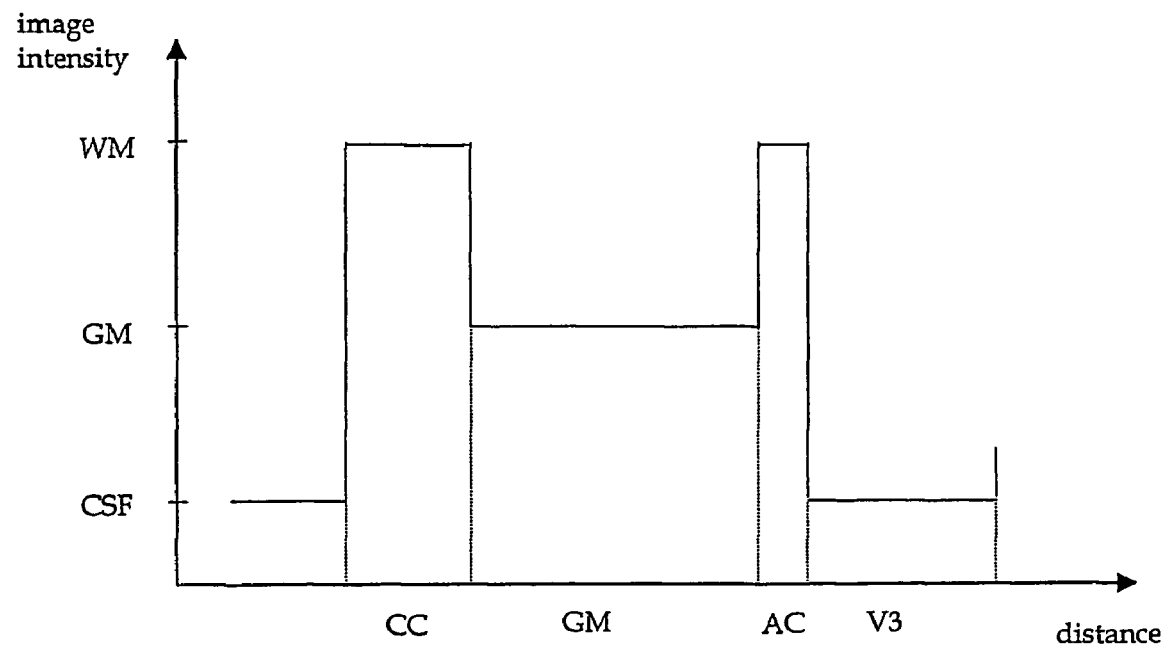
FIG. 10*b* is a graph representing a plot of intensities along the AC (vertical) line as drawn in FIG. 10*a*.

The user identifies one coronal image passing through the AC and another one passing through the PC. The anatomy of the AC image is shown in FIG. 10a, and the corresponding plot along the AC vertical line is drawn in FIG. 10b. The steps are as follows.

1. Optionally, extract the brain from the data. Use for that any standard operations, such as region growing combined with morphological operations. This step is not mandatory, but it facilitates the subsequent steps and may improve the accuracy of landmark identification. The extracted brain is treated as the new AC image, and the subsequent operations are applied to this image.

2. Calculate the histogram of this image and identify the intensity values for the cerebro-spinal fluid (C-SF), grey matter (GM), white matter (WM) and background (B) as shown in FIG. 5.

3. Calculate the complete vertical (dorso-ventral) orthogonal projection of the AC image. The shape of this projection is similar to that in FIG. 7b. If the calculated projection of the AC image substantially differs from the model projection FIG. 7b, the ventral (bottom) part of the image containing the neck has to be cropped to limit the AC image to the brain only.

4. Identify the central valley on this projection. The lowermost point of the central valley defines the position of the AC line.

5. Calculate the intensity profile along the AC line. In the ideal case, this profile should look like in FIG. 10b. The real profile differs from the ideal one because of noise, partial volume effect, not ideal positioning of the image, possible brain scoliosis.

6. Traverse this profile. Any direction of traversing can be used, such as starting dorsally (from the top) and move towards the AC. Identify the second WM peak from the top along the AC line. Take it as the AC peak.

7. For the identified AC peak, find its start and end points. Any method can be used for this purpose. In particular, the zero crossing of the second derivative can be used, see FIG. 6.

8. As the AC landmark, take the mean value of the start and end points of the identified AC peak.

Figure 10C:
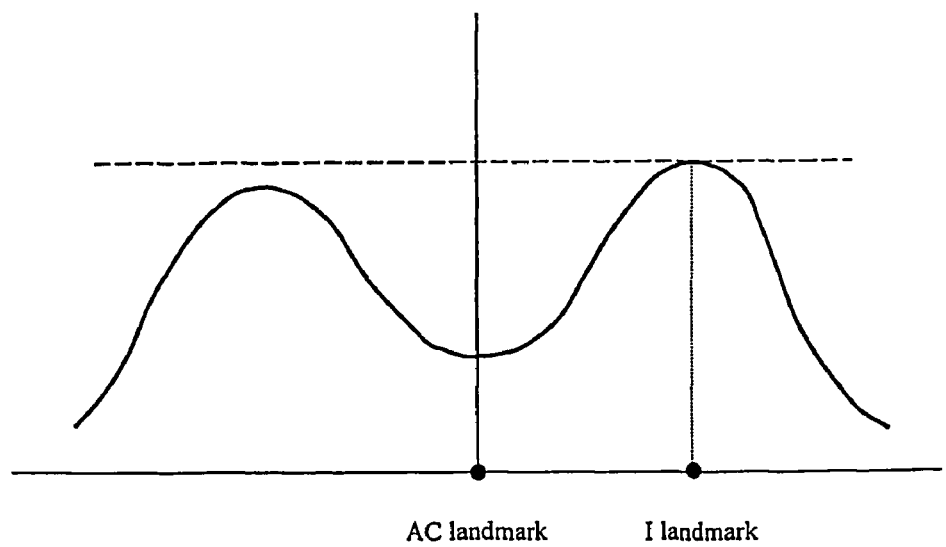
FIG. 10*c* is graph representing a partial vertical projection of the image in FIG. 10*a* taken from the AC horizontal line ventrally down. The highest peak corresponds to the I landmark.

9. Calculate a partial vertical (dorso-ventral) orthogonal projection of the AC image, ventrally from the AC horizontal line as shown in FIG. 10*a*. The shape of this projection is as in FIG. 10*c*.

10. Identify the highest point on this projection. It corresponds to the position of the vertical line passing through the inferior (I) landmark and gives the sagittal extent of the I landmark.

11. Traverse the I line ventrally from the AC horizontal line and identify the CSF peak. The peak has to be wide enough (for instance, few millimeters) to correspond to the cistern (interpeduncular fossa), and not to CSF between two gyri. The start point of this peak gives the axial extent of the I landmark.

Figure 11A:
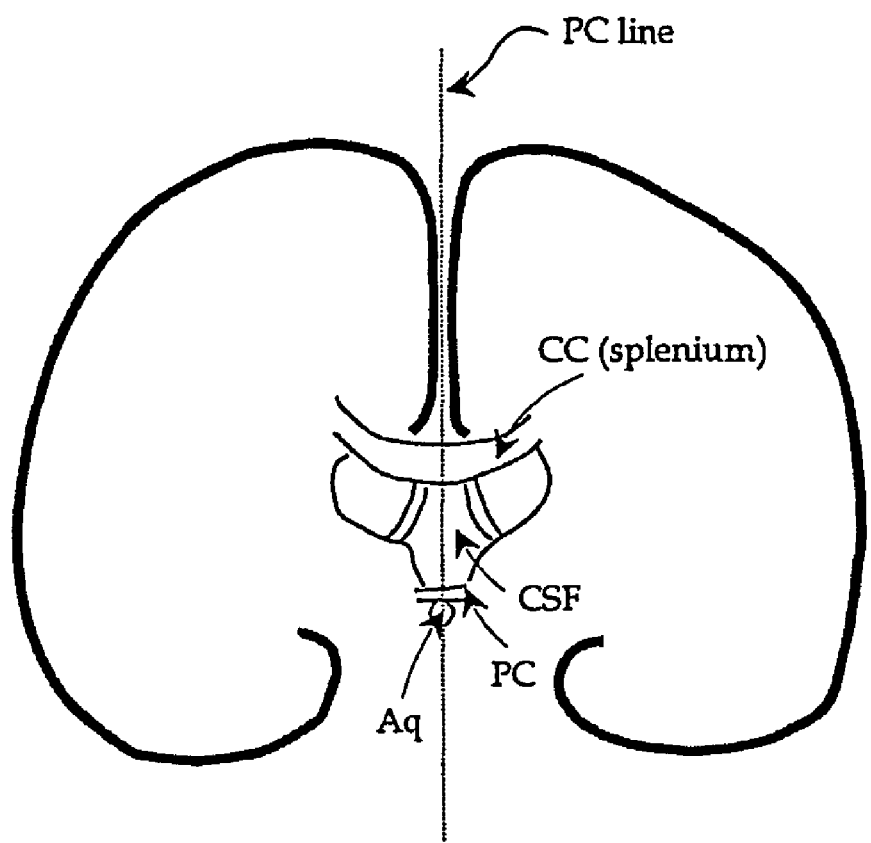
FIG. 11*a* is a diagrammatic representation of the coronal brain image passing through the PC along with the structures of interest.
Figure 11B:
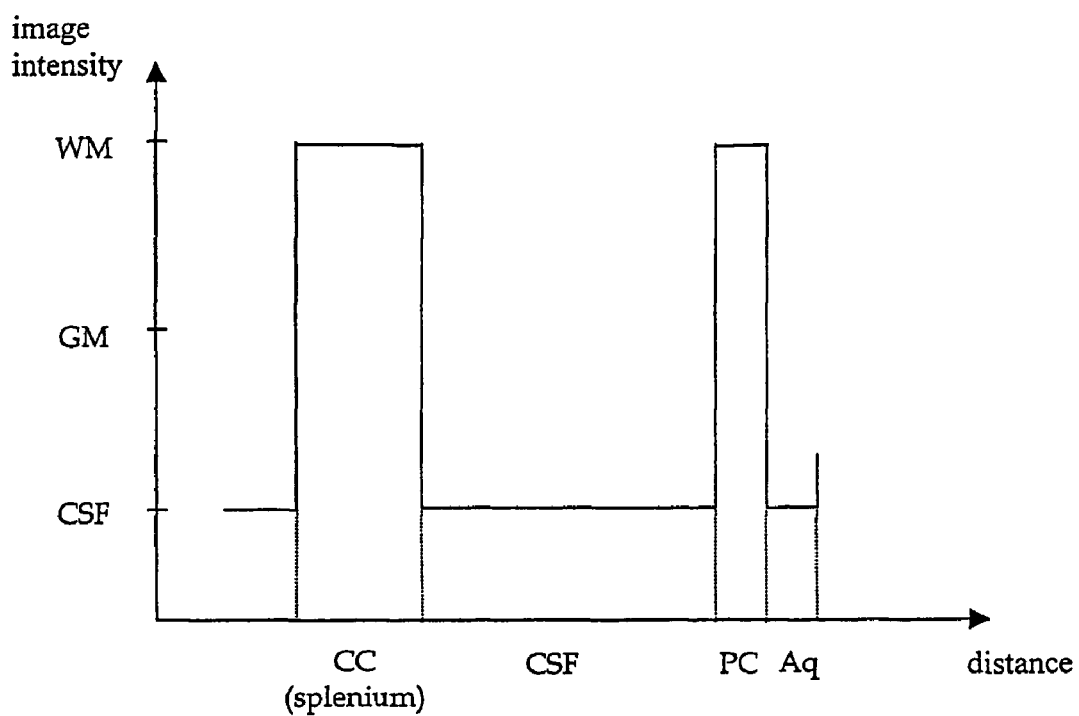
FIG. 11*b* is a graph representing a plot of intensities along the PC line as drawn in FIG. 11*a*.

The anatomy on the PC image is shown in FIG. 11*a*, and the corresponding plot through the PC line is drawn in FIG. 11*b*. The further steps are following.

12. Optionally, extract the brain from the PC image. Use for that any standard operations, such as region growing combined with morphological operations. The step is not mandatory, but it facilitates the subsequent steps and may improve the accuracy of landmark identification. The extracted brain is treated as the new PC image, and the subsequent operations are applied to this image.

13. Calculate the histogram of the PC image and identify the intensity values for the cerebro-spinal fluid (CSF), grey matter (GM), white matter (WM) and background (B) as shown in FIG. 5.

14. Calculate the vertical (dorso-ventral) orthogonal projection of the PC image. The shape of this projection is similar to that in FIG. 7*b*. If the calculated projection of the PC image substantially differs from the model projection FIG. 7*b*, the ventral (bottom) part of the image containing the neck has to be cropped to limit the image to the brain only.

15. Identify the valleys on this projection. The lowermost point of the central valley defines the lateral position of the PC line. The lowermost point of the left external valley defines the sagittal extent of the right landmark (R). The lowermost point of the right external valley defines the sagittal extent of the left landmark (L). In case when the brain is extracted from the PC image, the external peaks/valleys do not exist. Then, the left and right slopes of the projection define the sagittal extents of the L and R landmarks.

16. Calculate the intensity profile along the PC line. In the ideal case, this profile should look like in FIG. 11*b*. The real profile differs from the ideal one because of noise, partial volume effect, not ideal positioning of the image, and possible brain scoliosis.

17. Traverse this profile. Any direction of traversing can be used, such as starting dorsally (from the top) and move towards the PC. Identify the second WM peak from the top along the AC line. Take it as the PC peak.

18. For the identified PC peak, find its start and end points. Any method can be used for this purpose. In particular, the zero crossing of the second derivative can be used, see FIG. 6.

19. As the PC landmark, take the mean value of the start and end points of the identified PC peak.

20. For the given sagittal extents of the L and R landmarks (as calculated in Step 15), calculate their three-dimensional positions based on their definitions from FIG. 4.

21. Calculate the horizontal (left-right image) orthogonal projection of the PC image.

22. For the calculated horizontal projection, identify the lowermost points of the right extreme valley and take it as the axial extent of the superior (S) landmark. In case the brain is extracted from the PC image, the external peak/valley does not exist. Then, the right slope of this projection defines the superior (dorsal) extent of the brain.

23. For the given axial extents of the S and I landmarks (as calculated in Step 11), calculate their three-dimensional positions based on their definitions from FIG. 4.

24. Place at the PC that atlas axial plate, which passes through the PC (the axial atlas plate 1 mm above is taken, as the exact one is not available), and scale it linearly to fit to the R-L distance. The anterior and posterior extremes of the atlas plate define the coronal extents of the anterior (A) and posterior (P) landmarks.

25. For the given coronal extents of the A and P landmarks, calculate their three-dimensional positions based on their definitions from FIG. 4.

In the ideal case, the orthogonal projections of the AC and PC landmarks in coronal direction are in the same point, so only one of them may be calculated and placed accordingly at the counterparting image.

In order to enhance the accuracy of identification of the R, L, S, and I landmarks, the relevant steps can be applied outside the AC and PC image images. In particular, two-dimensional horizontal and vertical projections of the whole brain volume image can be calculated and the extent of the brain can be obtained from these projections.

In addition, the analysis of the profiles corresponding to the central valley for all coronal images, can lead to an automatic identification of the PC image (in the above algorithm, the PC image is selected manually by the user). The ideal profiles outside the AC and PC may have at most one white matter peak corresponding to the corpus collusum. Therefore, by analysing the number of white matter peaks in the profiles, the images with the AC and PC can be identified automatically by taking the images that contain two white matter peaks.

2.3.2.2. Rotated Coronal Images

When the PC image is rotated with respect to the PC line, the rotation angle has to be defined and the data images have to be rotated, such that the PC line is vertical (and then the algorithm formulated for the non-rotated case can be directly applied). Similarly to axial orientation, the rotation angle can be obtained by analyzing the orthogonal projections of the PC image and selecting the one with the deepest central valley (for T1-weighted images), as it contains the most CSF. The rotation angle is calculated automatically in the following steps.

1. Calculate the orthogonal projections of the PC image by taking the projections with a given angle step (for instance every 5 degrees).

2. Select the projections with bi-modal peaks (one central valley).

3. From these projections select one with the deepest central valley, see FIG. 8.

4. Generate more projections of the PC image around the projection selected in step 3 with a finer angle step in the range of the given angle step. For instance, in the range of +/−5 degrees around the projection selected in Step 3, the new image projections are generated with 1 degree finer angle step.

5. Find the projection with the deepest valley. The angle corresponding to this projection with the vertical line gives the rotation angle.

2.3.2.3. Imaging Modality Dependence

Imaging modality dependence is the same as for axial orientation, FIG. 9.

2.3.3. Sagittal Orientation

Figure 12:
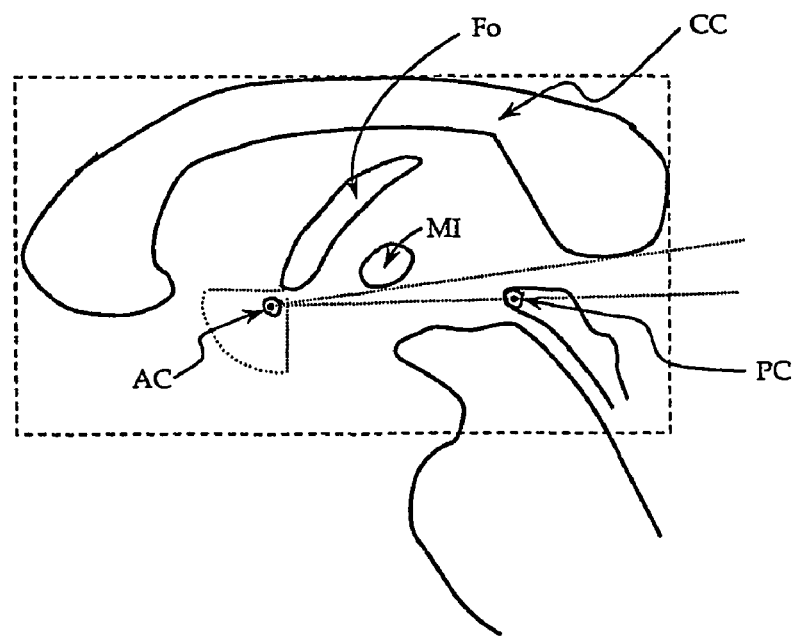
FIG. 12 is a diagrammatic representation of the midsagittal brain image along with the structures of interest.

The anatomy for the sagittal orientation is shown in FIG. 12.

For the manually identified midsagittal image, the T-N landmarks are calculated automatically as follows;

1. Optionally, extract the brain from the midsagittal image. Use for that any standard operations, such as region growing combined with morphological operations. This step is not mandatory, but it facilitates the subsequent steps and may improve the accuracy of landmark identification. The extracted brain is treated as a new midsagittal image, and the subsequent operations are applied to this image.

2. Calculate the histogram of the midsagittal image and identify the intensity values for the cerebro-spinal fluid (CSF), grey matter (GM), white matter (WM) and background (B) as shown in FIG. 5.

3. Extract the white matter structures from the midsagittal image. Any operation can be used for that, e.g., thresholding.

4. Identify the corpus collosum (CC) on the white matter image. Any template of the CC and any template matching algorithm can be used. In particular, the CC template can be taken from the Electronic Clinical Brain Atlas (Nowinski et al, 1997), and the maximization of the autocorrelation function can be used for template matching.

5. Define on the midsagittal image a rectangular bounding box around the CC. Form the region of interest from this bounding box by extending it in ventral direction. In particular, take the double height of the bounding box and use it as the height of the region of interest.

6. Calculate the histogram in the region of interest, and get from this histogram the new, enhanced values of the CSF, GM and WM.

7. Extract the white matter structures within the region of interest. Identify the formix (Fo) which is the biggest connected structure below the trunk of the CC. Any method can be used to identify the Fo; in particular, the structure with the biggest number of pixels can be taken as the Fo.

The fomix is a symmetrical structure located very close to the midsagittal plane and, in most cases, it should be present in the midsagittal slice which is acquired with a certain thickness. If the formix is not present in the midsagittal image, take a neighbouring image (left or right) and locate the formix there.

8. Find the most ventro-anterior (bottom-left most) point of the Fo, and take this point as the AC.

9. Draw from the AC a bottom-left quadrant with a small radius, FIG. 12. In particular, the radius can be of 1 cm.

10. If in this quadrant there are several white matter regions, take the most ventro-anterior one, calculate its center and take it as the new AC (discard the previous AC).

11. Extract the white and grey matter structures within the region of interest. Any operation can be used for that, e.g., thresholding. Identify the massa intermedia (MI) which is the only GM structure within the CC bounding box, under the CC trunk.

12. Identify the most ventral point of the MI.

13. Draw a semi-line from the AC passing through the most ventral point of the MI, FIG. 12.

14. Starting from this position, rotate the semi-line clockwise around the AC, and cast a ray along this semi-line.

15. Identify the first WM structure encountered by the ray in a certain distance from the AC. In particular, the distance ranging from 17 mm to 35 mm from the AC can be used.

16. Calculate the center of the identified WM structure and take it as the PC.

17. Draw a line passing through the AC and PC. The points of intersection of the cortex with this line define the A landmark (on the left side) and the P landmark (on the right side). Any direction of traversing the AC-PC line can be used. In particular, when traversing this line from outside, the first peak corresponds to the scalp and the following slope to the cortex (when the brain is extracted from the midsagittal image, the first peak does not exist and the slope corresponds to the cortex).

18. Draw a line perpendicular to the AC-PC line and passing through the PC. The point of intersection of the cortex with this line defines the axial extent of the S landmark (on the topside). Any direction of traversing the vertical PC line can be used. In particular, when traversing this line from outside, the first peak corresponds to the scalp and the following slope to the cortex (when the brain is extracted from the midsagittal image, the first peak does not exist and the slope corresponds to the cortex).

19. For the given axial extents of the S landmark, calculate its three-dimensional position based on its definition from FIG. 4.

20. Measure the S-PC distance between the S and PC landmarks.

21. Calculate the axial (ventral) extent of the I landmark proportionally with respect to the atlas. In particular, take the axial extent of the I landmark at the (S-PC)/74*43 distance from the AC-PC plane.

22. For the given axial extent of the I landmark, calculate its three-dimensional position based on its definition from FIG. 4.

23. Place at the PC that atlas axial plate, which passes through the PC (the atlas axial plate 1 mm above the AC-PC plane is taken, as the exact one is not available), and scale it linearly to fit to the A-P distance. The lateral extremes of this atlas plate define the sagittal extents of the left (L) and right (R) landmarks.

24. For the given sagittal extents of the L and R landmarks, calculate their three-dimensional positions based on their definitions from FIG. 4.

In order to enhance the accuracy of identification of the A, P, S, and I landmarks in three dimensions, the relevant steps can be applied to the images lying outside the midsagittal image. In particular, the maximum dorsal extent of the S landmark can be searched as in Step 18 along the whole AC-PC line, not only for the PC point. In a similar way, the I landmark can be searched on the images outside the midsagittal image.

The accuracy of the landmark identification in three dimensions can be enhanced by calculating two-dimensional horizontal and vertical projections of the whole brain volume image and obtaining from these projections the extent of the brain in axial, coronal and sagittal directions.

3. Labelling

Labelling consists of two major steps, label assignment and label placement. Label assignment determines the label, or labels, for the pointed location. Label placement is the way of displaying the label, or labels, on the image. Labeling can be done in two modes, a single label mode and multi-label mode.

3.1. Label Assignment

Label assignment is done in two steps. First, for a pointed data location, the corresponding atlas location is calculated. Second, for a given atlas location, its label is determined.

When a cursor is placed over the data image, the coordinates of the image location are read and the coordinates of the corresponding atlas plate are calculated based on the inverse registration transformation. In particular, this may be the inverse Talairach transformation.

For a given atlas location, its label can be determined in two ways. When a fully color-coded atlas is used (the atlas in image representation), a table is constructed with color-structure correspondence. The color read at the pointed location indexes this table and gives the name of the pointed structure.

When the atlas is used in geometric representation, the structures are available as contours (sets of points). Every contour has the assigned (corresponding) structure and this assignment is stored in the contour-structure table. A given atlas location is checked against the existence of the smallest contour containing this location, and when the contour is identified, it indexes the contour-structure table and the label is produced.

3.2. Label Placement

The labeling can be done in two modes: single label mode and multi-label mode. The single label mode is dynamic, while the multi-label mode is static In single-label mode, the name of the structure is placed on the image next to the cursor. In particular, it can be placed in a circle of 5 pixel radius. The label is refreshed dynamically such that is follows the moving cursor.

In multi-label mode, the user can place interactively multiple labels on the image. The user clicks the image, drags the mouse and draws the arrow pointing to the structure, releases the mouse, and the label is displayed at the end of the arrow. When the clicked location is not labelable (which means no label exists for it), the arrow is not drawn.

The same method of producing the label on the image can be used when the user searches for a structure in the image by selecting the name of the structure in the anatomical index (list).

4. Regions of Interest

Figure 13:
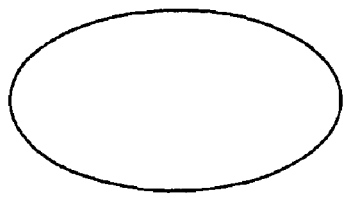
FIG. 13 illustrates three different regions of interest, ellipsis, rectangle and polyline.
Figure 13:
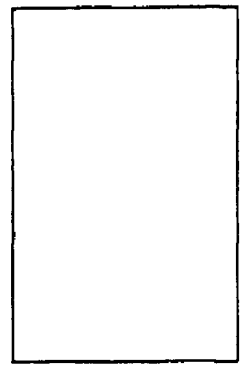
Figure 13:
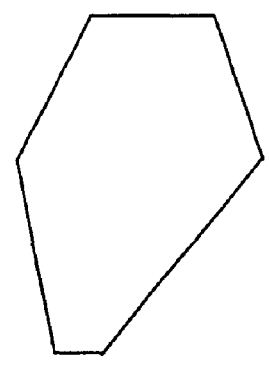

The region of interest can be drawn by the user as a geometrical object related to the labelled structures. In general, the region of interest can be any closed polyline; in most cases, however, this region will be rectangle or ellipsis, FIG. 13.

The regions of interest can also be annotated to provide additional diagnostic information. The user can first define several regions of interest and label the structures within them. Alternatively, he or she can label the relevant part of the image first and then encompass it within the region of interest. The placement of regions of interest is optional.

5. Mensuration

The user is allowed to measure distances and angles on the data images.

6. Saving

The atlas-enhanced images prepared by the neuroradiologist can be saved for further processing by other medical professionals. The present invention proposes two ways of saving the atlas-enhanced images (or, in the extreme case, the atlas itself), as a web-enabled file and/or as DICOM file, FIG. 14.

Figure 14:
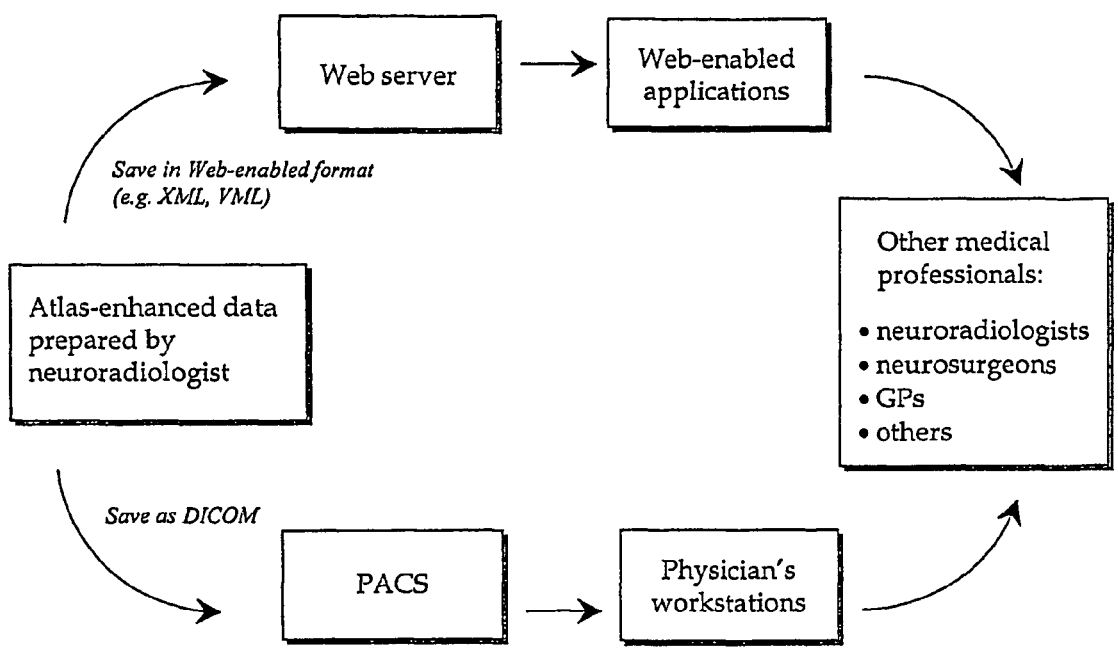
FIG. 14 is a chart illustrating the process of generating and transferring of atlas-enhanced images. The images are prepared by the neuroradiologist and are transferred to other medical professionals through web-enabled applications (in XML format) and through PACS-dependent physician's workstations (in Dicom format).

The atlas-enhanced images stored in a web-enabled format such as XML are suitable for web-enabled applications, while stored in DICOM format they can be saved in Picture Archival and Communication System (PACS) and used in Dicom compatible applications, such as radiological or surgical workstations for further processing by neurologists, neurosurgeons and other medical professionals, FIG. 14. The data and atlas images can be saved separately as two corresponding images or as a single image with a user-defined amount of blending between them.

Figure 15:
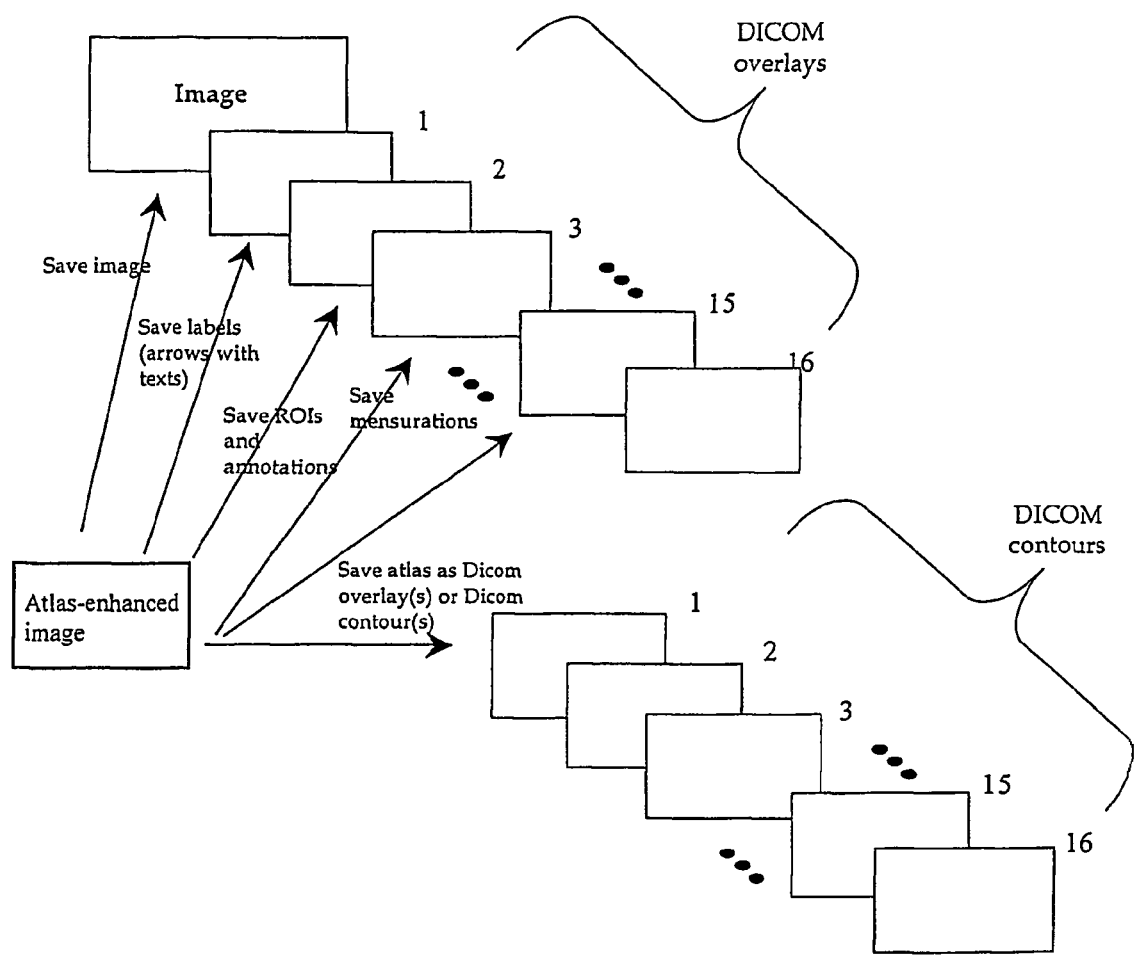
FIG. 15 illustrates saving of the atlas-enhanced image in Dicom format.

FIG. 15 illustrates a method of saving the atlas-enhanced image in Dicom format. The labels (texts and arrows), the regions of interest (ROIs) with annotations, and the mensurations are saved in three different Dicom overlays (Dicom 60xx). The atlas, represented as a color image, can be stored in multiple Dicom overlays (there are 16 of them in total). In particular, if the 8-bit indexed color is used (256 colors), each atlas byte corresponding to a given location can be stored in eight Dicom overlays.

When the atlas is in geometric representation (which means, as a set of contours) the contours can be saved in a single Dicom overlay. Alternatively, the contours can be saved in Dicom contour overlay (Dicom 50xx).

The atlas enhanced data can be stored in any web-enabled markup language. In particular, this markup language can be XML (eXtensible Markup Language). The atlas and data images can be saved then as bitmapped image elements (which means as layers which subsequently can be blended), while the labels, regions of interest, annotations, mensurations, and/or atlas in geometric form (set of contours) can be saved as vector graphics. Vector graphics data can be saved, for instance, as VML elements, where VML (vector markup language) is an application of XML.

REFERENCES

The content of the following references are incorporated herein in their entirety by reference.
1. Davatzikos C., "Spatial transformation and registration of brain images using elastically deformable model", Computer Vision and Image Understanding, Vol. 66, No. 2, 1997, 207-222.
2. Hoehne K. H., VOXEL-MAN, Part 1: Brain and Skull. Springer-Verlag, Heidelberg, 1995.
3. Nowinski W. L., Bryan R. N., Raghavan R. "The Electronic Clinical Brain Atlas. Multiplanar Navigation of the Human Brain". Thieme, New York—Stuttgart, 1997.
4. Talairach J. and Tournoux P. "Co-Planar Stereotactic Atlas of the Human Brain". Georg Thieme Verlag/Thieme Medical Publishers, Stuttgart—New York, 1988.
5. Brummer M. E. "Hough transform detection of the longitudinal fissure in tomographic head images" IEEE Transactions on Medical Imaging, Vol 10, No. 1, March 1991, 84-81.

The invention claimed is:

1. A method of analysing an image of a brain by a computer device, the method comprising:
   receiving data defining a three-dimensional image of a brain;
   comparing the received data with a brain atlas to generate a three-dimensional mapping between the image and the brain atlas by warping the brain atlas to the received data, thereby generating an individualized brain atlas;
   using the mapping to annotate the received data; and
   writing said annotated data as one or more data files;
   wherein in writing said annotated data, the annotated data is written in Dicom, including one or more Dicom overlays or in a web-enabled format, with the received data and the individualized brain atlas saved separately as two corresponding images; and
   wherein the annotated data is provided to compatible workstations for further processing by medical professionals.

2. A method according to claim 1 in which said data is received from a file in Dicom format.

3. A method according to claim 1 in which said comparison is performed by:
   (i) identifying a set of first features in said image corresponding to respective second features in said brain atlas;
   (ii) defining a first direction in said image, and a plurality of first planes in the image perpendicular to and spaced apart in said first direction, each first plane containing one or more of said first features, and corresponding to a respective second plane in the brain atlas containing the corresponding one or more second features;
   (iii) partitioning each first plane into rectangular sections based on said first features;
   (iv) for each first plane, applying a linear transformation to each section to transform its dimensions to be equal to those of a respective rectangular section of the corresponding second plane; and
   (v) defining a transformation of the spacing between said first plane which makes the spacing of the first planes equal to the spacing of the corresponding second planes.

4. A method according to claim 1 in which said comparison is performed by:
   (i) identifying a set of first features in said brain atlas corresponding to respective second features in said image;
   (ii) defining a first direction in said brain atlas, and a plurality of first planes in the brain atlas perpendicular to and spaced apart in said first direction, each first plane containing one or more of said first features, and corresponding to a respective second plane in the image containing the corresponding one or more second features;
   (iii) partitioning each first plane into rectangular sections based on said first features;
   (iv) for each first plane, applying a linear transformation to each section to transform its dimensions to be equal to those of a respective rectangular section of the corresponding second plane; and
   (v) defining a transformation of the spacing between said first plane which makes the spacing of the first planes equal to the spacing of the corresponding second planes.

5. A method according to claim 1 in which said annotation is performed by selecting regions of interest on the image, and deriving from the brain atlas information associated with this region of interest.

6. A method according to claim 1 in which said annotation includes placing text on the brain image.

7. A method according to claim 1 in which said annotation includes placing mensuration on the brain image.

8. A method according to claim 1 in which said annotation includes labelling of one or more regions of interest based on labels associated with corresponding portions of the brain atlas.

9. A method according to claim 8 in which a user selects said regions of interest successively, and the labels at any instant correspond to the corresponding selection.

10. A method according to claim 1 in which a user points or clicks any structure in the image successively, and, at the pointed location the label of the said structure is being generated, while when clicking and dragging the mouse the line is drawn and the label of the said structure is placed at the end of the said line.

11. A method according to claim 6 comprising generating a lookup table defining a mapping between the portions of the image and respective anatomical indices, said labels being generated using the table.

12. A method according to claim 11 in which the user can select a region of interest using either said image or by selecting one of said indices.

13. A method according to claim 1 in which said comparison is based on a plurality of landmarks in the image.

14. A method of mapping an image of a brain to an existing brain atlas by a computer device, the method comprising:
   (i) identifying a set of first features in said image corresponding to respective second features in said brain atlas;
   (ii) defining a first direction in said image, and a plurality of first planes in the image perpendicular to and spaced apart in said first direction, each first plane containing one or more of said first features, and corresponding to a respective second plane in the brain atlas containing the corresponding one or more second features;
   (iii) partitioning each first plane into rectangular sections based on said first features;
   (iv) for each first plane, applying a linear transformation to each section to transform its dimensions to be equal to those of a corresponding rectangular section of the corresponding second plane; and (v) defining a transformation of the spacing between said first plane which makes the spacing of the first planes equal to the spacing of the corresponding second planes;

wherein the brain image is annotated using said mapping method and said annotated image is written in Dicom including one or more Dicom overlays, or in a web-enabled format, with the brain image and the brain atlas saved separately as two corresponding images; and wherein the annotated data is provided to compatible workstations for further processing by medical professionals.

15. A method of mapping an existing brain atlas to an image of the brain by a computer device, the method comprising the steps of:

(i) identifying a set of first features in said brain atlas corresponding to respective second features in said image;

(ii) defining a first direction in said brain atlas, and a plurality of first planes in the brain atlas perpendicular to and spaced apart in said first direction, each first plane containing one or more of said first features, and corresponding to a respective second plane in the image containing the corresponding one or more second features;

(iii) partitioning each first plane into rectangular sections based on said first features;

(iv) for each first plane, applying a linear transformation to each section to transform its dimensions to be equal to those of a corresponding rectangular section of the corresponding second plane; and (v) defining a transformation of the spacing between said first plane which makes the spacing of the first planes equal to the spacing of the corresponding second planes;

wherein the brain image is annotated and an individualized brain atlas is generated using said mapping method and said annotated image is written in Dicom, including one or more Dicom overlays or in a web-enabled format, with the brain image and the individualized brain atlas saved separately as two corresponding images; and wherein the annotated data is provided to compatible workstations for further processing by medical professionals.

16. A method according to claim 14 in which said features of the image are a plurality of landmarks.

17. A method of forming a mapping between a brain image and a brain atlas by a computer device, the method including:

defining a plurality of landmarks in the image, said landmarks being calculated using peaks and valleys of a graph of the density profile of the image measured along a line and/or peaks and valleys of a projection along a specified direction; and forming said mapping based on the correspondence of the positions of said landmarks in the brain image with corresponding landmarks in the brain atlas.

18. A method according to claim 17 in which the line is the AC-PC line.

19. A method according to claim 18 further including identifying the position of the AC-PC line from an antero-posterior projection of the image.

20. A method according to claim 19 in which the position of the AC-PC line is defined using the location of the central valley of the antero-posterior projection of the image.

21. A method according to claim 17 in which the line is the AC line or the PC line.

22. A method according to claim 17 in which the orientation of the image is determined by obtaining a projection of the image at each of a plurality of angles, and orientation (the rotation angle) is derived from the projection for which the central depression is deepest.

23. A method according to claim 22 in which the orientation determined is the axial orientation, the plurality of projections of the image are at each a plurality of angles, and the rotation angle is derived from the projection for which the central depression is deepest.

24. A method according to claim 22 in which the orientation determined is the coronal orientation, and the plurality of projections of the image are at each of a plurality of angles.

25. A method according to claim 13 in which the landmarks include the left L and/or right R landmarks on the axial image, which are calculated based on the locations of the right external valley and the left external valley in the vertical (antero-posterior) projection of the image.

26. A method according to claim 13 in which the landmarks include the anterior A and/or posterior P landmarks on the axial image which are calculated based on the locations of the right external valley and the left external valley in the horizontal (left-right) projection of the image.

27. A method according to claim 13 in which the landmarks include the right R and/or left L landmarks on the coronal image which are calculated based on the locations of the left external valley and the right external valley in the vertical (dorso-ventral) projection of the image.

28. A method according to claim 13 in which the landmarks include the superior S landmark on the coronal image which is calculated based on the location of the right external valley in the horizontal (left-right) projection of the image.

29. A method according to claim 13 in which the landmarks include inferior I landmark on the coronal image which is calculated based on the location of the highest peak in the partial vertical (dorso-ventral) projection of the AC image taken ventrally from the AC horizontal line.

30. A method as claimed in claim 17 in which each reference to a "peak" is replaced by a reference to a "valley", and each reference to a valley is replaced by a reference to a peak.

31. A method according to claim 13 in which the landmarks include the superior S and inferior I landmarks on the axial image which are calculated based on the scaling of the brain atlas.

32. A method according to claim 13 in which the landmarks include the anterior A and posterior P landmarks on the coronal image which are calculated based on the scaling of the brain atlas.

33. A method according to claim 13 in which the landmarks include the AC landmark on the midsagittal image which is calculated based on the analysis of the bounding box around the corpus collosum and identifying below it in the constraint region the most ventro-anterior white matter structure.

34. A method according to claim 13 in which the landmarks include the PC landmark on the midsagittal image which is calculated by drawing a semi-line from the AC to the bottom of the massa intermedia, and rotating this line clockwise until the first white matter structure is encountered.

35. A method according to claim 13 in which the landmarks include the anterior A and posterior P landmarks on the midsagittal image which are calculated by drawing a line passing through the AC and PC landmarks and identifying the extent of the cortex.

36. A method according to claim 13 in which the landmarks include the superior S landmark on the midsagittal image is calculated by drawing a line perpendicular to the AC-PC line and passing through the PC and identifying the intersection of this line with the cortex.

37. A method according to claim 13 in which the landmarks include the inferior I landmark on the sagittal image which is calculated by scaling the brain atlas.

38. A method according to claim 13 in which the landmarks include the left L and R landmarks in the sagittal three-dimensional brain image which are calculated by scaling the brain atlas.

39. A method as claimed in claim 1 in which an image of the brain is any medical imaging modality image.

40. A computing device having a processor and a memory storing a program which when implemented to performs a method according to claim 1.

41. A computer-readable medium comprising computer program instructions readable by a computer apparatus to cause the computer apparatus to perform a method according to claim 1.

42. A method according to claim 17 in which the brain image is annotated using said method of forming the mapping between the brain image and the brain atlas and said annotated image is written in one or more Dicom overlays or in a web-enabled format, with the brain image and the brain atlas saved separately as two corresponding images.

43. A method according to claim 1 further including a step of defining a plurality of landmarks in the image, said landmarks being calculated using peaks and valleys of a graph of the density profile of the image measured along a line and/or peaks and valleys of a projection along a specified direction.

44. A method according to claim 14 wherein identifying the set of first features in said image comprises defining a plurality of landmarks in the image, said landmarks being calculated using peaks and valleys of a graph of the density profile of the image measured along a line and/or peaks and valleys of a projection along a specified direction.

45. A method according to claim 15 further including identifying the second features in said image by defining a plurality of landmarks in the image, said landmarks being calculated using peaks and valleys of a graph of the density profile of the image measured along a line and/or peaks and valleys of a projection along a specified direction.

46. A method according to claim 1 in which said web-enabled format is XML format.

* * * * *